(12) United States Patent
Rajapakse

(10) Patent No.: US 8,677,002 B2
(45) Date of Patent: Mar. 18, 2014

(54) STREAMING MEDIA SYSTEM AND METHOD

(75) Inventor: Ravi Rajapakse, San Francisco, CA (US)

(73) Assignee: Blackfire Research Corp, San Francisco, CA (US)

( * ) Notice: Subject to any disclaimer, the term of this patent is extended or adjusted under 35 U.S.C. 154(b) by 1618 days.

(21) Appl. No.: 11/627,957

(22) Filed: Jan. 27, 2007

(65) Prior Publication Data

US 2007/0180137 A1    Aug. 2, 2007

(51) Int. Cl.
 *G06F 15/16*    (2006.01)
(52) U.S. Cl.
 USPC ........................................................ 709/231
(58) Field of Classification Search
 USPC ........................................................ 709/231
 See application file for complete search history.

(56) References Cited

U.S. PATENT DOCUMENTS

| | | | |
|---|---|---|---|
| 5,721,878 A * | 2/1998 | Ottesen et al. ................. | 725/87 |
| 6,374,079 B1 | 4/2002 | Hsu | |
| 6,987,947 B2 | 1/2006 | Richenstein et al. | |
| 7,106,715 B1 * | 9/2006 | Kelton et al. ................. | 370/338 |
| 7,669,113 B1 * | 2/2010 | Moore et al. ................. | 715/201 |
| 2002/0124097 A1 | 9/2002 | Isley et al. | |
| 2002/0169833 A1 | 11/2002 | Tani et al. | |
| 2004/0147282 A1 | 7/2004 | Nakasato et al. | |
| 2004/0193675 A1 | 9/2004 | Fillebrown et al. | |
| 2004/0223622 A1 | 11/2004 | Lindemann et al. | |
| 2006/0062401 A1 | 3/2006 | Neervoort et al. | |
| 2006/0149850 A1 | 7/2006 | Bowman | |
| 2007/0076908 A1 | 4/2007 | Castaneda et al. | |
| 2008/0242222 A1 | 10/2008 | Bryce et al. | |

FOREIGN PATENT DOCUMENTS

EP    1398931 A1    3/2004

OTHER PUBLICATIONS

PCT International Search Report and Written Opinion, PCT/US07/61229, Feb. 14, 2008, 9 pages.
Supplemental European Search Report, European Patent Application No. EP 07717473, May 20, 2009, 7 Pages.
International Search Report and Written Opinion for PCT/US 07/73620, Feb. 15, 2008, 8 pages.
Communication Pursuant to Article 94(3) EPC for European Patent Application No. 07717473.8, Dec. 14, 2011, 6 pages.

* cited by examiner

*Primary Examiner* — Maceeh Anwari
(74) *Attorney, Agent, or Firm* — Galvin Patent Law LLC; Brian R. Galvin

(57) ABSTRACT

A system and method for streaming media on a wireless network is provided. In one aspect, the system includes a streaming device driver; a multidestination wireless streaming protocol module, a multitank level algorithm module, a synchronization mechanism module, and an autoequalizing speaker and drive system module. The system and method minimize latency, dropout, jitter, and synchronization issues associated with media streaming while optimizing performance and output quality of the media.

24 Claims, 9 Drawing Sheets

STREAMING MEDIA SYSTEM AND METHOD

RELATED APPLICATION

This application claims priority under 35 U.S.C. §119(e) to U.S. Provisional Patent Application Ser. No. 60/766,573, filed on Jan. 28, 2006, entitled "A Technique For Streaming Audio And Multimedia Over A Wireless Network", the entire content of which is incorporated herein by reference.

BACKGROUND OF THE INVENTION

The present invention relates generally to the field of data communications; and more specifically, to streaming media over a wireless or wired IP network to a media arrangement.

Streaming media, sometimes referred to as "media streams", "streaming data", "media data", or "data", are media that are continuously received by, and normally output to, an end user while the media are being delivered by a provider. Streaming media include, for example, data in the form of audio, video, graphics primitives, applets, interactive content, or a combination thereof, sometimes referred to as multimedia or multimedia streams. Streaming is typically accomplished using data packets, sometimes referred to as packets, which are transported over a communications network, such as a wireless network.

Current methods for streaming media may be problematic, however, due to a number of problems. These problems include, for example: (1) source dependency; (2) latency, (3) dropout, (4) jitter, (5) synchronization of multiple independent destinations, and (6) signal conversion and compensation.

First, source application dependency may be an issue. In a typical streaming environment, a source of the streaming media such as a handheld device or mobile telephone includes a software streaming media application. This software application is designed with a specific protocol for streaming to the destination devices. Even if there are standards defined for such a protocol, the application and the destination devices must adhere to this standard to be able to stream to the devices. A typical PC media application that is already designed to work with the standard local media devices on a PC, would not be able to stream to destination devices without modification to the source application to make it adhere to the streaming protocol of the destination device (i.e., each media application would need to be modified to implement the streaming protocol, in order for it to stream media to destination devices).

Second, latency may be an issue. In a typical local area network (LAN) design is based on an inherently asynchronous Carrier Sense Multiple Access/Collision Avoidance (CSMA/CA) protocol at the physical layer. Under the CSMA/CA protocol, the actual moment that a packet may be successfully transmitted to its destination is unpredictable.

Third, dropout may be an issue. Dropout, or packet drops, generally refers to a loss of data somewhere during transit of the network. For example, use of an 802.11 wireless network has a high likelihood of dropping packets for several milliseconds due to noise or other causes. Thus, it is not guaranteed that the packet will actually make it across the network and to the destination. Wired IP networks such as Ethernet also drop packets when Ethernet cannot transmit the packets across the network.

Fourth, jitter may be an issue. Jitter generally refers to the variation in the time between arrival of packets. The variation may be caused by, for example, network congestion, timing drift, or route changes. Devices along the packet's path in the network may further delay the packet for additional random amounts of time. Further, if the source or destination applications are operating in a multitasking operating system, further delays may be introduced before the packets in the stream are actually serviced. Such variations in the arrival times of packets may result in degradation in the quality of the output and other adverse consequences.

Fifth, synchronization of multiple destinations may be an issue. One of the problems of streaming multimedia to multiple independent destination devices over a wireless network is how to synchronize the destinations such that they all output the same stream audio sample, e.g., sound, at the same time. Multimedia streams, such as an audio stream, require a constant stream of regular data to be provided to a destination device, e.g., an output device, to operate properly. For example, a 44.1 KHz audio output device requires an audio data sample every 22.6 uSecs. If the multimedia stream is being sent to multiple destinations, each output device needs to be synchronized to one another, such that all the output devices output the same data sample at the same time. The degree to which these data samples are offset may or may not be noticeable to a user, depending on the media and on the viewing or listening circumstances.

A synchronization issue also arises when streaming video to multiple independent destinations that are viewable by the same person. If the images need to be synchronized then each image frame presented at each destination needs to be presented at the same time.

Sixth, signal conversion may be an issue. For example, once streaming audio has reached an output device such as a speaker, the speaker converts an electrical signal to a sound wave to produce the audio sound necessary for listening by an end user. Currently, a loudspeaker, or speaker, is a passive device with a permanent magnet and a voice coil in the magnetic field of the permanent magnet. When the voice coil is connected to the output of an audio amplifier generating an audio signal, the current flowing through the voice coils causes a force that moves the speaker diaphragm. The diaphragm, in turn, moves the air causing a sound compression wave. The sound compression wave period is proportional to the force and current going through the voice coil. The speaker attempts to correctly translate the time domain and frequency domain characteristics of the electrical signal coming from the amplifier to an equivalent sound wave in the air. Although much effort is put into the design of the amplifier to ensure the accurate representation of the signal, current conversion techniques are extremely nonlinear due to various reasons including mechanical damping effects, mechanical ringing, and magnetic flux Linkage behavior, thus resulting in less than optimal performance and quality.

Seventh, streaming performance is impacted by communication channel contention. When many devices are using the same radio channel to communicate using a CSMA/CA protocol, performance can be significantly degraded if they all communicate at unpredictable times and many compete for the channel at the same time. A destination device may be competing for the channel to respond to a prior message, just when the source needs to be transmitting data to all the channels. The source transmission could therefore be preempted by a destination device responding at an inappropriate time. If this contention is unmanaged, streaming performance and throughput will be degraded.

Streaming media over a wireless network to a media arrangement can be implemented through the use of various different streaming protocols. The development of incompatible protocols by different organizations also results in a situation where media sources are restricted to interoperate with only a small subset of commercially available media destination types.

SUMMARY OF THE INVENTION

The present invention overcomes the deficiencies of the prior art with a system and method that minimize latency, dropout, jitter, contention and synchronization issues associated with media streaming while optimizing performance and output quality of the media. In one embodiment, the system includes a streaming device driver; a multidestination wireless streaming protocol module, a multitank level algorithm module, a synchronization mechanism module, and an autoequalizing speaker and drive system module. The components are communicatively coupled to process a media signals. The present invention also includes methods for contention management and for synchronizing the time output of data samples. These and other features, aspects and advantages of the present invention will become better understood with reference to the following drawings, description and claims.

DETAILED DESCRIPTION OF THE INVENTION

The following detailed description is one of a number of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a technique for streaming media over a wired or wireless IP network. The technique is also applicable to streaming media over other IP networks, such as networks that use IP over other physical layers communication technologies such as Ethernet, optical fiber, ATM etc and over custom, specially designed RF, wired and optical networks. For example, various aspects of the present invention include a technique and algorithm for streaming media over an IEEE 802.11x network to multiple destinations.

Embodiments of the present invention may be used in conjunction with output devices, for example, wireless audio speakers. Such a system may be used, for example, by an auditorium or theater to complement a musical or theatrical performance or by commercial restaurants or hotels or campuses or by an individual in a home environment. Other applications and uses are also possible. The source could be a hand held device such as a cell phone or music player. A user could for example play media from a music player that is enabled with this system, to play music to wireless audio speakers. Several users could alternately play music to these speakers and share a common listening experience.

Various embodiments of the present invention differ, for example, from prior art streaming media implementations in that such prior art implementations do not employ the unique algorithmic and system components of the present invention which solve a number of problems not solved by the prior art. These problems may include, for example, the latency, jitter, dropout, contention management, synchronization of multiple independent destinations, and signal conversion issues previously described.

Figure 1:
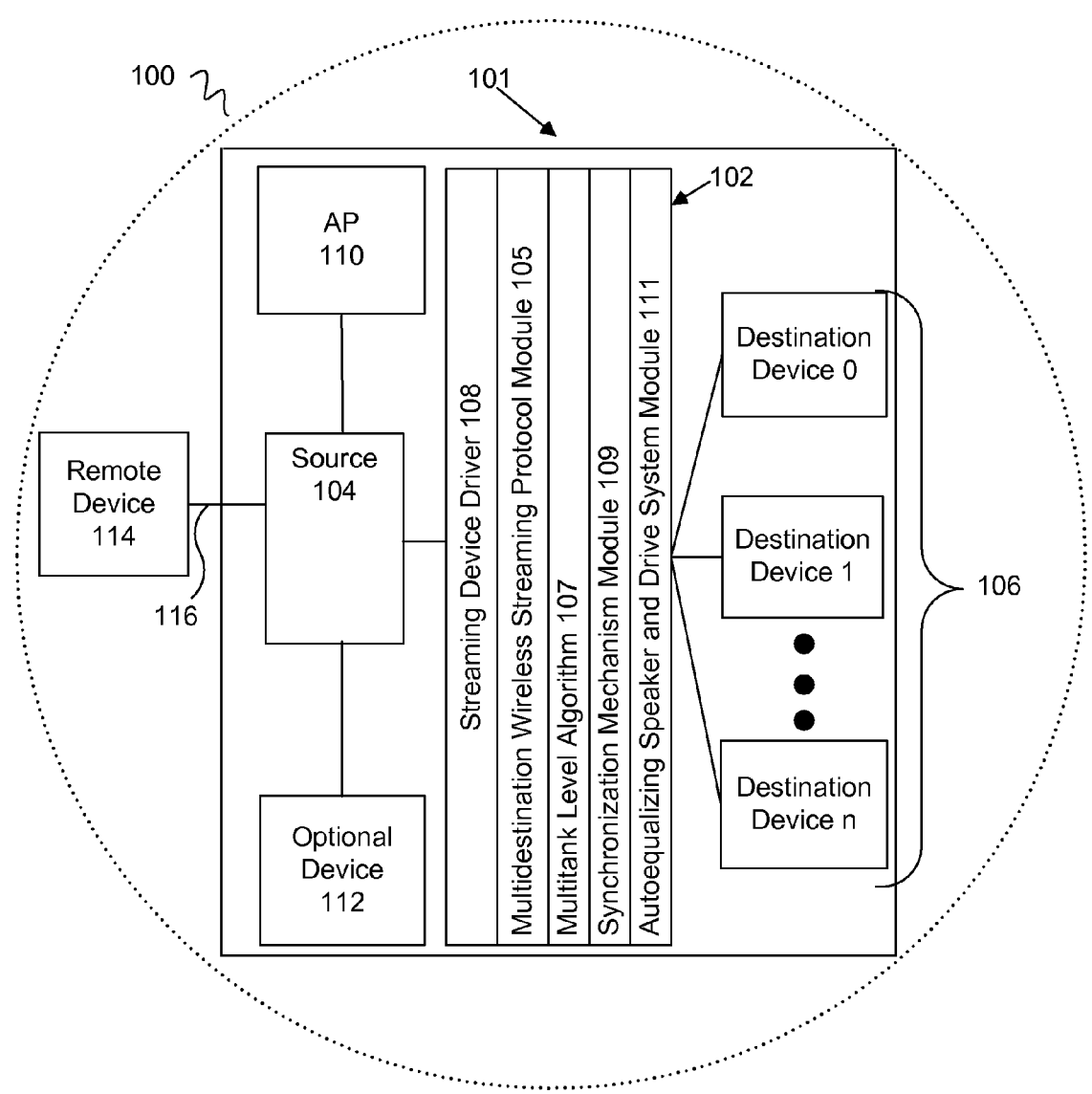
FIG. 1 is a block diagram illustrating a communications environment having a streaming media system in accordance with an embodiment of the present invention.

FIG. 1 is a system block diagram illustrating a communications environment 100 having a media arrangement 101 and a streaming media system 102 in accordance with an embodiment of the present invention. Communication environment 100 includes an environment capable of transmitting, receiving, or both any type of data and/or media, expressed in any manner, and may further include various devices and components associated with the processing, storage, and/or transmission and receipt of such data, media and signal. Media arrangement 101 may include, for example, a source 104; a streaming media system 102; and one or more destination devices 106. Optionally, media arrangement 101 may further include a wireless access point (AP) 110, one or more optional devices 112, or combinations thereof. In addition, communication environment 100 may include one or more remote devices 114 and one or more communication Links 116.

Source 104 generally streams data via streaming media system 102 to one or more destination devices 106, which consumes the streaming data and converts it to a predetermined data expression such as sound, video, etc. For example, in one aspect a personal computer (PC) transmits data according to streaming media system 102 to multiple speakers, which, in turn, converts the data to audible sound.

Source 104 in various different embodiments includes PCs, laptop computers, personal digital assistants (PDAs), cell phones, handheld computing devices, music player devices and any other device or component that could emit or provide media data for delivery to a destination. The term "PC" includes any computing platform, such as media players or cable set top boxes or handheld devices, having one or more processors. In various aspects, source 104 may also be capable of receiving the data from another device or source. For example, source 104 may be a laptop or PDA that is playing an audio file via a media player software tool such as WINDOWS ® Media Player (WINDOWS is a registered trademark of an operating system produced by Microsoft Corporation, One Microsoft Way, Redmond, Washington, U.S.A.). Source 104 may have received the audio data via a communication Link 116 such as the Internet from a remote device 114 such as a web server. Source 104 may be also engaged in simultaneous or alternating activities. An example of such an activity includes rendering media from a media source located elsewhere. Source 104 and destination devices 106 may also be performing device discovery and configuration and control, for example, by using an industry standard Universal Plug and Play (UPnP) protocol.

Source 104 may also be a device that gets audio data from analog audio sources such as a legacy stereo system or cable or satellite TV device.

Streaming media system 102 generally optimizes media system performance and quality. In one aspect, streaming media system 102 includes one or more of the following modules: a streaming device driver 108; a multidestination wireless streaming protocol module 105; a multitank level algorithm module 107; a synchronization mechanism module 109; and an autoequalizing speaker and drive system module 111. These components are adapted for communications with each other and other parts of the system 100 to provide the functionality of the present invention.

Streaming media system 102 may include any software, hardware, device, component, or combination thereof, necessary to carry out the functionality described herein. Further, streaming media system 102, and its individual components, may be configured in various ways, including integrated with, or independent of, various devices. In one example, streaming media system 102 includes device driver 108, multidestination wireless streaming protocol module 105, multitank level algorithm module 107, and synchronization mechanism module 109, each of which are implemented as a software module integrated with or associated with source 104. In another example, streaming media system 102 includes autoequalizing speaker and drive system module 111, which is integrated with or otherwise associated with destination devices 106.

Streaming device driver 108 generally facilitates transmission of the data to one or more destination devices 106, as hereinafter discussed in detail.

Multidestination wireless streaming protocol module 105 generally facilitates transmission of the streaming data to destination devices 106 via a specific methodology. Multidestination wireless streaming protocol module 105 is discussed in further detail in the section entitled, "Multidestination Wireless Streaming Protocol".

Multitank level algorithm module 107 generally determines which streamed data has to be resent or reconstructed from redundant information. Multitank level algorithm module 107 is discussed in further detail in the section entitled, "Multitank Level Algorithm".

Synchronization mechanism module 109 generally synchronizes data output to destination devices. Synchronization mechanism module 109 is discussed in further detail in the section entitled, "Synchronization Mechanism".

Autoequalizing speaker and drive system module 111 generally provides an active device for speaker output optimization. Autoequalizing speaker and drive system module 111 is discussed in further detail in the section entitled, "Autoequalizing Speaker and Drive".

Destination devices 106 generally receive streamed data, including audio and multimedia. Destination devices 106 include any device capable of or designed to receive data transmitted over a network such as a wireless network. One example of destination devices 106 are wireless IP addressable speakers. For example, destination devices may be embodied as a multimedia subsystem with remote wireless amps, as further discussed in the section entitled, "Multimedia Subsystem With Remote Wireless Amps".

The media being streamed may include one or more channels of media, such as left and right audio channels. Each destination device may be configured to receive and output one or more of these channels. In some embodiments, multiple destination devices may output the same channel. An example of this would be stereo audio (left and right channel) being streamed to many auditoriums networked over a large area in a campus. Each auditorium may have left and right speakers, each of which represents the left and right channel from the media stream being received. Therefore there may be as many speakers representing the left channel of the media stream as there are auditoriums. Alternatively a center channel speaker may receive both the left and right channel and locally mix it to represent a center channel. This would be an example of a single destination receiving multiple channels in the stream.

In one aspect of the invention, data is streamed from source 104 to destination devices 106 via wireless Links 116. As one skilled in the art will appreciate, streamed data may include various types, such as audio, video, and multimedia. The wireless Links 116 may be collectively referred to in some aspects as a "wireless network". As one skilled in the art will appreciate, such a wireless network may assume various constructions, conform to various protocols, and/or include various configurations and devices. For example, the wireless network formed by the wireless Links 116 may conform to the 802.11x standard. Yet other aspects of the invention include or are associated with wired Links or various combinations of wireless Links and wired Links.

In one aspect, source 104 transmits or broadcasts directly to destination devices 106, and an AP 110 manages the wireless network in "infrastructure mode". Alternatively, source 104 may communicate with destination devices 106 in "ad hoc mode" without AP 110.

Source 104 may include or be further associated with streaming device driver 108. Streaming device driver 108 may reside, for example, as a software module on source 104. Streaming device driver 108 may be associated with one or more types of source devices, e.g., handheld devices or mobile telephone, and may be further associated with various manufactures of source devices. Streaming device driver 108 may receive data from one or more software applications (not shown) associated with source 104, and, in turn, facilitate transmission of the data to one or more destination devices 106. The device driver 108 software module may include functionality of other modules in media system 102, such as multidestination wireless streaming protocol module 105, multitank level algorithm 107 or synchronization mechanism module 109.

In one aspect, streaming device driver 108 may also include the functionality associated with some or all precompensation activities. Precompensation generally refers to the process of compensating for deficiencies in the media or the devices that render the media into audio or video. In addition, precompensation can be used to enhance an aspect of the media. For example, the high frequency element of the media could be enhanced in amplitude to provide a 'sharper' sound or video image.

In this aspect, streaming device driver 108 may obtain properties of the speakers and use this information to process and compensate the media at the source, e.g., source 104. In this example, source 104 obtains the frequency response of each destination speaker and compensates to equalize the final output so that the final output of the speaker has a flat frequency response. This will produce the most accurate representation of the original media without introducing unintended sound artifacts. The advantage of precompensation at the source is most valuable when common compensation across all media channels needs to be performed. The properties of the speaker used for precompensation may be obtained by the source by sending messages to the destinations requesting the properties. In addition the source may store property information that it obtains from the destinations for later use.

In another aspect, some or all of the precompensation activities may be performed by autoequalizing speaker and drive system module 111, which may reside on one or more destination devices 106, as discussed hereinafter.

With respect to the data or media, various forms and formats are contemplated. For example, the data transmitted may include an audio file in a variety of formats such as MP3, WMF, etc. As heretofore described, source 104 includes, for example, a software media player which may be any player including a movie player that receives media from a device such as a DVD or an internet-based player. Internet-based players, in turn, include but are not limited to audio players such as Rhapsody® (Rhapsody is a registered trademark of Real Networks Inc) or iTunes® audio players (iTUNES is a registered trademark of Apple Computer, Inc., 1 Infinite Loop Cupertino, Calif., U.S.A.). The audio player, in turn, receives its media via the internet.

In one aspect, audio players stream audio data to an audio device integrated or otherwise associated with source 104. For example, in the case of a PC, the associated audio device may be an audio "device driver" on the PC.

In one aspect, streaming device driver 108 will represent an AC 97 or Intel HD audio or other standard type of audio device to the PC software. Such an audio device enables any software media player that plays audio via standard mechanisms to play the audio out to destination device 106, e.g., remote speakers, without any special configuration of the software media player. In this manner, source dependency is eliminated as streaming device driver 108 allows any standard PC media application to play as usual on the PC, but have its audio played on the destination devices, without any modification to the media application. Streaming device driver 108 enables this by representing the media system to the source device and the software application running on the source as a regular standard audio device connected to the source. The source and the source software application believe this is a standard local audio device and use the devices as it is already designed to be used.

Streaming device driver 108 may also perform a variety of activities, alone or in combination, such as audio data mixing, up or down data rate conversion, pre compensation, de-channelization of multi channel data, compression and blocking in addition to then performing the streaming of the audio data to destination devices.

The audio data may be transported in any form, e.g., raw form, compressed, converted, etc. In one aspect, the media stream is compressed at the source using the FLAC codec and decoded at the node prior to outputting the data to a speaker.

The data may be processed prior to being transported and/ or after being received, e.g., filtering, channel mixing, sample rate change, sample format change, equalization, etc.

In addition to source 104, optional devices 112 may also be present on the network. Optional devices 112 may include, for example, audio sources such as those which get audio data from analog audio sources and stream the audio data to source 104 for broadcast to destination devices 106. These devices cause streaming from source 104 indirectly. Note, as used herein, all references to broadcasting include both the IP network technique of 'broadcasting' and 'multicasting' to multiple destinations at once.

Wireless Contention Management Protocol for Multidestination Wireless Streaming

Figure 2:
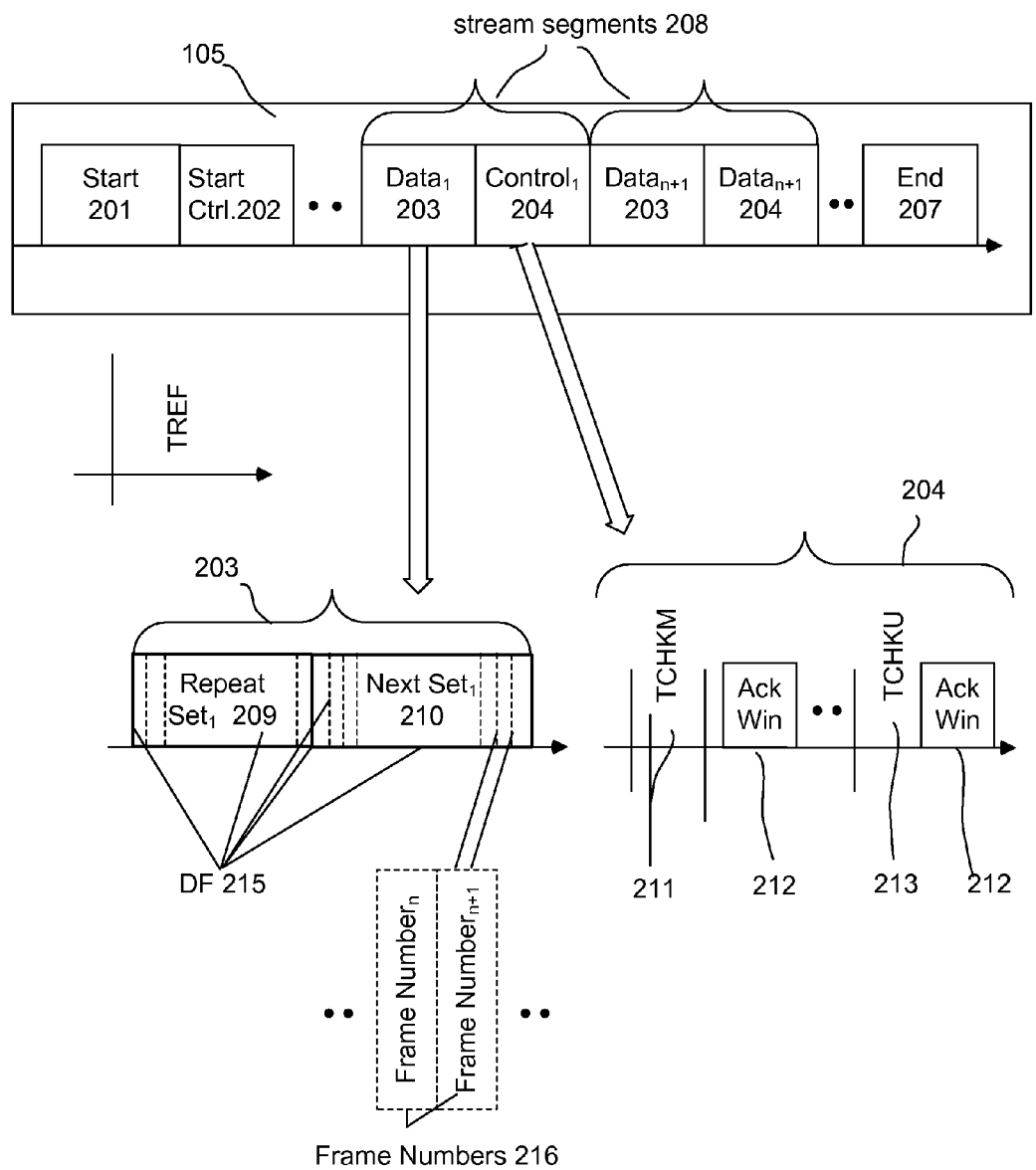
FIG. 2 is a functional diagram of the operation of a multidestination wireless streaming protocol module of the streaming media system shown in FIG. 1 in accordance with an embodiment of the present invention.

FIG. 2 is a more detailed view of a multidestination wireless streaming protocol module 105 of streaming media system 102 shown in FIG. 1 in accordance with an embodiment of the present invention.

Multidestination wireless streaming protocol module 105, sometimes referred to simply as "streaming module 105", may be used to simultaneously stream media data to multiple destinations over a wireless network such as a network conforming to the 802.11 protocol. Streaming module 105 may include any software, hardware, or combination thereof necessary to implement its described functionality. Further, it is recognized that an 802.11 wireless network has (1) a high likelihood to drop packets for several milliseconds; (2) has relatively poor performance when one or more devices have a consistent and frequent need to contend for the RF channel; (3) in certain scenarios, where multiple devices may occasionally need a channel without a fixed, definite need on a per-device basis, multiple access is needed and may be handled by a CSMA/CA-like process; and (4) if noise causes packet drops, it will likely cause packet drops for all destinations.

In view of the foregoing, streaming module 105 improves the basic CSMA/CA protocol model used in conjunction with 802.11 wireless networks. Streaming module 105 may generally be described in the following manner: attempts to use the RF channel are limited to specific windows. During a data window, the source exercises exclusive control over the channel to transmit data segments. During control windows, CSMA/CA-like carrier sense multiple access techniques are used for multiple destinations to respond back to the source. In this manner, performance is not degraded with destination devices contending for the channel during data windows. During the data window the source has uninterrupted access to stream data. During the control window destinations respond on an as needed basis using standard CSMA/CA. Alternative schemes such as time slots (exclusive control over the channel for a specified period of time) for devices (TDMA) are not used as they may waste a time slot on a device that may not need the channel at that instance in time. In this manner, streaming module 105 minimizes performance degradation due to channel contention for devices that have a consistent need to use the channel, while optimizing channel usage among devices with sporadic or limited needs for the channel. This technique is important for maximizing streaming performance over physical transport layers that use CSMA type channel access means such as 802.11 and Ethernet.

Streaming module 105 uses a protocol that includes a start segment 201; multiple stream segments 208; and an end segment 207 that marks the end of the current stream. Each new stream has the same segments described above. Each stream segment 208 includes a data window 203 and a control window 204. A start control segment 202 may follow start segment 201.

Data Window

During data window 203, the data sources stream data to the multiple destination devices using, for example, a broadcast or multicast addressing scheme. The data is streamed, for example, in two sets of data. The first set in data window 203 is a repeat set 209. Repeat set 209 is a repeat of a section of data that was streamed in a previous set in a previous data window. This repeat data has data that the destination did not receive in the previous 'next set' 210. The second set of data in data window 203 is a next set 210. Next set 210 contains streaming data beginning at the end of the previous repeat set 209 or overlaps into the previous next set 210.

In one aspect, repeat set 209 and next set 210 contain series of data frames (DF) 215. Each DF 215 is marked with a frame number 216 and contains sequential multi or single channel audio data samples, i.e., consecutive frames contain data samples that are consecutive in time. Therefore, ensuring receipt of adjacent and consecutive frame numbers ensure the receipt of continuous data samples.

Each repeat set 209 or next set 210 therefore consists of a set of data frames 215, each data frame 215 starting at one frame number 216 and ending at another frame number 216, with consecutive frames numbers 216 in between.

The set of data frames 215 to be sent in each data window 203 is determined by the source, based on information received during the previous control window and a "multi tank level" algorithm, discussed in detail below.

Control Window

Control window 204 starts immediately after the end of next set 210, and is marked with the transmission of a TCHKM multicast message 211, sometimes referred to simply as "TCHKM". TCHKM 211 starts the beginning of a TCHK/DSTAT response algorithm. One skilled in the art will recognize that there are a number of variations of this algorithm. For example, in one variation, each destination device responds to TCHKM 211 with a TCHK/DSTAT message. Each such destination device competes for media access to provide this response. The source will listen for a response from each of the destination devices present in the system, for a period of time defined as an ACK window time 212, sometimes referred to simply as "ACK". For each destination device that responds, the source uses the contents of the TCHK/DSTAT message to update the state of its "multi tank level table" (shown as 301 in FIG. 3), discussed hereinafter.

For each destination device that does not respond within ACK 212, the source sends a UNICAST TCHKU message 213, sometimes referred to simply as "TCHKU". The source waits for a TCHK/DSTAT message response. The source repeats this process RETRY time to get a response. If no response is received, streaming is aborted and an error is returned to the system, to check the system configuration.

In an alternative embodiment the TCHKU message may be a broadcast message to all destinations at once. Each destination then responds with at TCHK/DSTAT message.

Once all destination devices have responded with a TCHK/DSTAT message, the current stream segment 208 ends. The next stream segment 208 starts with the source sending the next repeat set 209 and/or next set 210. The start of data streaming signifies the start of data window 203.

In one aspect, destination devices operate only in polled mode, responding to multicast or unicast commands from the source during the control window 204. During data windows 203 all destination devices are silent and are only receiving data. This eliminates unnecessary RF media access contention, thus eliminating performance degradation.

Multitank Level Algorithm

Figure 3:
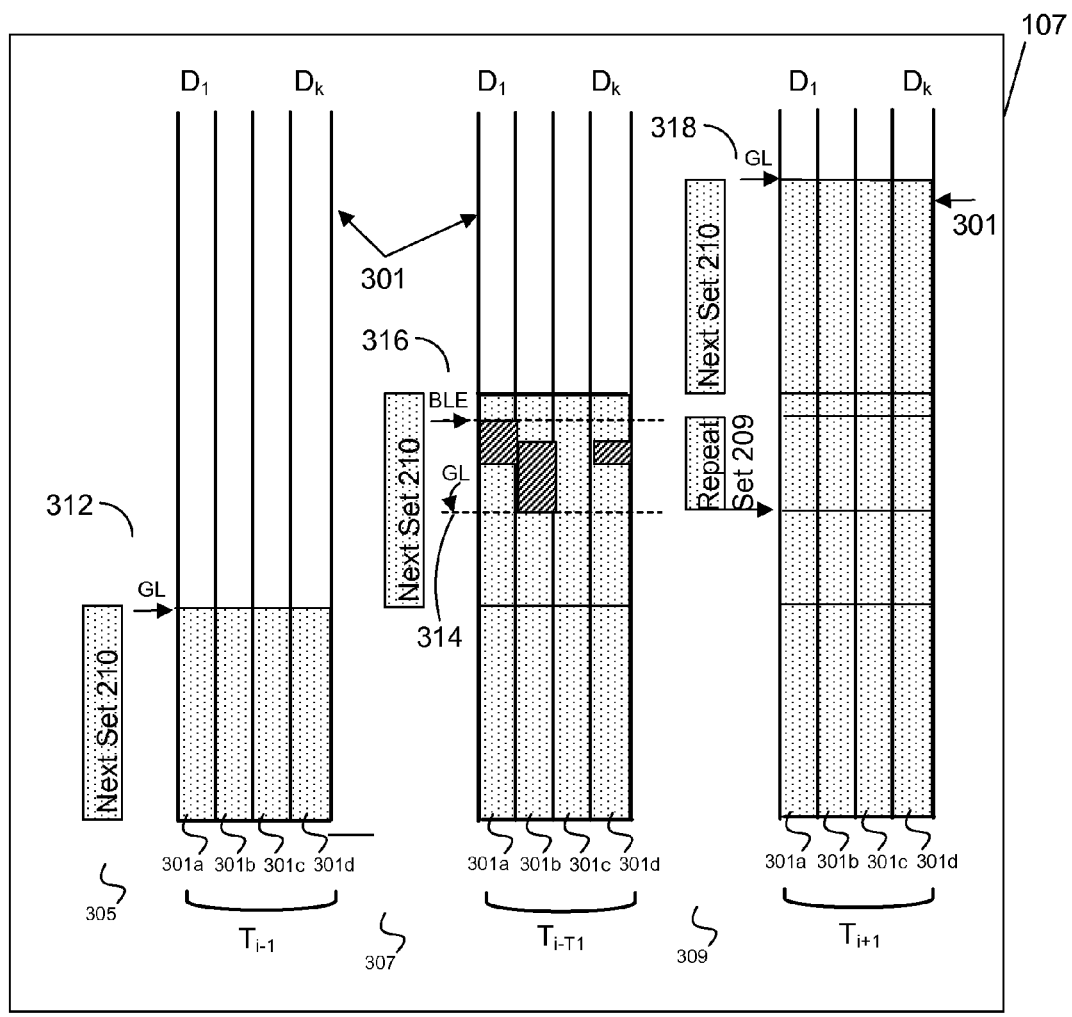
FIG. 3 is a functional diagram of the operation of a multitank level algorithm module of the streaming media system shown in FIG. 1 in accordance with an embodiment of the present invention.

FIG. 3 is a functional diagram that shows the operation of multitank level algorithm module 107 of streaming media system 102 shown in FIG. 1 in accordance with an embodiment of the present invention. Multitank level algorithm module 107, sometimes referred to simply as "multitank module", is designed to determine how much of the data that has been streamed out has to be resent. While the word tank is used here to provide a conceptual analogy, another more typical term would be a first in first out (FIFO) 'queue' or 'buffer'. For example, streamed data typically will need to be resent if the wireless data stream was interrupted due to noise or other interference. Data may also be dropped due to the non-guaranteed design of IP transport. Multitank module 107 may include any software, hardware, or combination thereof necessary to implement its described functionality.

With reference to the streaming process in general, each TCHK/DSTAT message that each destination device sends back to the source during a control window, has two parameters: a good level (GL) indicator and a bad level end (BLE) indicator. The GL indicator indicates the last good frame number received by that destination, with no missing frames below it. The BLE indicator indicates the last frame number that is missing in the stream data that the destination node has.

Multitank module 107 generally includes one or more multitank level (MTL) tables 301. Each MTL table 301 is associated with a time instance, e.g., $T_{i-1}$, $T_i$, and $T_{i+1}$. Each MTL table 301 includes one or more multitanks, e.g., multitanks 301a, 301b, 301c, and 301d. Each multitank in the MTL table 301 is associated with a corresponding destination node D, e.g., $D_1$ through $D_k$. For example, multitank 301a is associated with a first speaker, multitank 301b is associated with a second speaker, and so forth.

The time instances represent instances of consecutive stream data windows. Thus, MTL table 301 is a way of representing a stream level at each destination node D, e.g., destination device such as a speaker.

More particularly, each multitank in the MTL table 301 may be viewed as a columnar tank at a destination node D, the columnar tank being filled with sample data from the top as sample data arrives. The lightly shaded regions of the multitank level tables 301 represent data stream having no missing frames, while the heavily shaded regions of the multitank level tables 301 represent data missing frames of data in various data streams, as further explained.

Sample data is removed from the bottom by periodically removing sample data from the bottom to be played through destination node D, e.g., the speaker. In practice, this filling/removing process acts as a circular, first in-first out (FIFO) buffer with the top and bottom always moving up. Each multitank 301a-301d is placed parallel to the others as shown in FIG. 3.

After receipt of a stream segment 208 (shown in FIG. 2), each destination node D reports its GL and BLE during the control windows to the source. The source uses this information to update its MTL table 301. For each destination node, the source records the GL and BLE received. The source finds the lowest GL to determine the lowest GL for an MTL table 301, also referred to as the lowest table GL, or simply "TGL". Similarly, the source uses each BLE to determine the highest BLE for set of MTL tables 301, also referred to as the highest table BLE, or simply "TBLE".

If TBLE-TGL is less than a predetermined threshold, TRESEND, then the next repeat sequence will contain frames starting at sequence number TGL and ending at TBLE. This means the next repeat set 209 will contain a repeat of all the data that may be missing at the destination nodes D. The next set 210 after this repeat set 209 will have a starting frame number, $NDSTARTFRAME_i$, set to the last NDENDFRAME+1, where NDENDFRAME is the ending frame number of the previous "next set" 210. NDENDFRAME for this current frame is set to NDSTARTFRAME+NDFRAMES, where NDFRAMES is the number of frames in each "next set" 210.

If TBLE-TGL is greater than TRESEND, then no repeat set 209 is present in the next data window and the "next set" 210

NDSTARTFRAME number is set to TGL and NDEND-FRAME$_I$ is set to NDSTARTFRAME+NDFRAMES. This means all data frames starting at the lowest GL will be resent.

This process ensures that if the number of dropped (missing) frames is small, only these frames are recent in the next data window. If the number of dropped frames is large, the whole stream is resent starting at the last known good level for all destinations. In this manner, the effects of dropout are minimized.

To illustrate, at time $T_{i-1}$ 305, the frames of next set$_{i-1}$ 210 are added to multitank level table 301. No frames are missing from this set, as indicated by GL 312 indicator. At time $T_i$ 307, the frames of next set$_{210}$ are added to multitank level table 301. In this time instance, some frames are missing, while others arrive intact, as indicated by the heavily shaded areas and lightly shaded areas of multitank level table 301, respectively. GL 314 indicator indicates the last good frame number received by that destination, with no missing frames below it. BLE 316 indicator indicates the last frame number that is missing in the stream data that multitank level table 301 has at this time instance.

After calculating TBLE-TGL for this instance, it is determined that the difference is less than a predetermined threshold. Therefore, the next repeat sequence contains frames starting at sequence number TGL and ending at TBLE. This means the next repeat set 209, shown at $T_{i+1}$, contains repeat set 209, a repeat of all the data missing at the destination nodes D. Because the amount of missing s relatively small as compared with the entire amount of frames sent in next set 210 at time instance $T_i$, the recent missing frames stream segments are sent. At time instance 309, next set 210 after the current repeat set 209 adds data to multitank level table 301. No frames are dropped during the add process for next set 210, resulting in a GL indicator 318.

Synchronization Mechanism

Wired and wireless protocols based on CSMA cannot predict exactly when the source, i.e., source device, will transmit a packet. However, if this packet is a broadcast packet, i.e. one that any destination device can receive, when the broadcast packet is actually transmitted all destination devices receive the packet at the same time. This is because all the destination devices are listening to and interpreting data on the same physical media at the same time. Each destination device receiving RF circuitry and media access controller (MAC) introduces a further delay prior to providing the packet to the Data Link layer, sometimes referred to as the Link layer, in the Open Systems Interconnection (OSI) Basic Reference Model. The RF and MAC is implemented in hardware; its delay is fixed and very fast. To achieve optimized synchronization results for multiple destinations while minimizing delays, in one aspect of the present invention, the packet is intercepted at the Link layer by the synchronization mechanism, as further discussed in detail. Intercepting the packet at the Link layer, ensures the detection of the receipt of the packet at the earliest possible time by the destination device. Link layer interception means detecting the packet in the network device driver. Doing so means detecting the packet at the earliest possible time after the network hardware has received it. Alternatively, if the packet is only detected in a user mode application, the latencies and jitter introduced by the operating system at the destinations will be too large for synchronization to work. Link layer interception means that latency and jitter that would otherwise be introduced locally at the destination are minimized.

Figure 4:
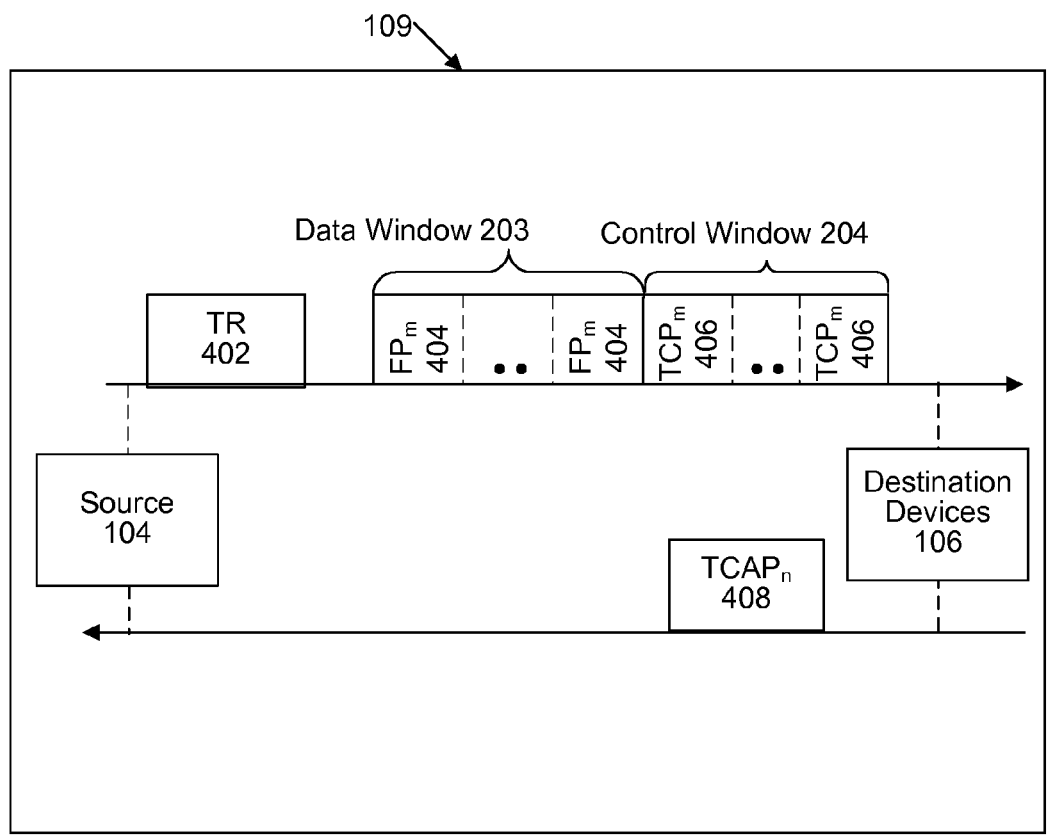
FIG. 4 is a functional diagram of the operation of a synchronized mechanism module of the streaming media system shown in FIG. 1 in accordance with an embodiment of the present invention.

FIG. 4 is a functional diagram of the operation of synchronized mechanism module 109 of streaming media system 102 shown in FIG. 1 in accordance with an embodiment of the present invention.

In general, synchronization relies on local clocks at each destination device where the clocks rate is high enough that clock count values can be used to measure microsecond time intervals. Time intervals are measured by reading and computing an elapsed clock count value over the interval and then dividing the elapsed count by the clock rate to obtain the elapsed time interval. However, a challenge in synchronization schemes is that the clock rates at each destination clock may not be exactly the same and will drift.

Synchronization schemes, in general, further rely on messages being broadcast to all destinations from a host, where all the destinations receive the broadcast message at the same absolute time. However, in practice the absolute time that each device may receive this message will vary by an amount that is dependent on the transport channel used for communication. This variation will cause a 'jitter' in event time measurements, with respect to absolute time.

Synchronization schemes may further use the clocks and time measured at the first destination as the global time and scale all clock and time values from other destinations to this global time.

In one aspect of the present invention, therefore, firstly assume all destination clocks have exactly the same clock rate and that there is no jitter in the receipt of broadcast. At the start of streaming, source 104 broadcasts a Time Reference (TR) packet 402, sometimes referred to as a time reference message, to the group of destination devices. During streaming, a series of Frame data packets (FP) 404 are sent during data window 203 and a series of Time Check packets (TCP) 406 during a control window 204. TCP 406 are sometimes referred to as time check messages. Each destination device k, 106, receives the TR packet 402, and at the Link layer of the receiving device, records the receive timestamp (TR) of the TR packet 402. TR packet 402 includes a time offset (FSOF) at which to start outputting the data in frame 0. Destination device 106 starts output of Frame 0 at TR +FSOF and continues outputting frames, at a preset frame period, as long as sufficient FPs are received to allow continued output. The clock time at which frames after the start are output are also adjusted by a frame advance or retard FADV clock value received in subsequent TCP packets.

Whenever a TCP$_n$ 406 is received, the Link Layer also records the local clock value at the time of receipt, for it: TC$_n$, and sends back a time check acknowledge in a TCAP$_n$ packet 408 (or TCHK/DSTAT) to source 104. The TCAP$_n$ packet 408 includes the clock stamp TC$_n$, the number of the last frame that was output Fm, and EFC$_n$ the elapsed clock count from the start of output of this frame to the receipt of the TCP$_n$. TCAP$_n$ packet 408 having this information is sometimes referred as an elapsed time message.

Source 104 receives time checks TC$_n$, the elapsed counts EFC$_n$ and frame number Fm for all destination devices 106 (assume k devices).

Based on this information the source has and computes:

| | |
|---|---|
| $ETC_{nk} = TC_{nk} - TC_{(n-1)k}$ | Elapsed clock between TCP |
| $EFC_{nk}$ | Elapsed clock from the start of the last frame output |
| $OTC_{nk}$ | Clock offset between destination 1 and destination k |

If there is no jitter and the clock rates at all destinations are exactly the same, the elapsed count $ETC_{nk}$ and $EFC_{nk}$ from each destination k will be exactly the same. $OTC_{nk}$ will reflect differences in the time since power on of each destination and will remain constant for each destination. Further, the source will know that frame m was output at absolute time $T_n$ by all destinations, where the clock count at time $T_n$ at destination 1 is $TC_{n1}$ and at destination k is $TC_{nk}$.

In practice, each clock stamp will have a jitter J in its count due to transport jitter. This means each elapsed clock value will have the same jitter J to its value. The source, therefore, passes all elapsed and offset values through a low pass filter over a period of time that provides a filtered elapsed count that reduces the inaccuracies introduced by the transport jitter. The source puts all elapsed counts through this filter and so all transport jitter is compensated for. All elapsed and offset count values mentioned below are therefore values that are already filtered values.

Further, since in practice the clock rates at each destination will differ, the source uses the filtered elapsed count between TCP packets, $ETC_{nk}$, to scale the frame elapsed count $EFC_{nk}$ to a value relative to destination 1.

Therefore, using the filtered ETC values the source can convert any destination interval to a destination 1 relative value.

$S_{nk}=(ETC_{n1}/ETC_{nk})$=instantaneous clock rate ratio between clock k and clock 1

$EFC_{nk\_1}=EFC_{nk}*S_{nk}$

Also since $OTC_{nk}=TC_{nk}-(TC_{n1}/S_{nk})$=destination k clock offset when destination 1 clock was 0.

Using the filtered OTC values the source can convert any destination clock value $TC_{nk}$ to a destination 1 relative value. $TC_{nk\_1}=(TC_{nk}-OTC_{nk})*S_{nk}$.

Using this scale and offset information, the source knows that frame n was output at clock time $TC_{n1}-ETC_{n1\_1}$ by destination 1 and at clock time $TC_{nk\_1}-ETC_{nk\_1}$ by destination k, all based on destination 1 clock time.

The source 104 then uses this information to compute a frame advance or retard value FADV for each destination k. It will include this frame advance or retard FADV value in the next time check packet $TCP_m$ 406, sometimes referred to as an adjust time message. If the computed FADV for a destination device 106 is larger than a threshold, FADVTH, source 104 will divide the FADV value by the threshold and the result will determine how many of the next $TCP_m$ 406 will have a FADV value set to FADVTH. This is to ensure that each frame start adjustment does not result in too big of an adjustment, and is spread over the time interval to send a number of $TCP_m$ 406.

If a $TCP_m$ 406 has a FADV value that is non-zero, destination device 106 adds this value to the start time of the next frame data sample output. If the value is negative, the start time is brought forward. In this manner, synchronization issues are minimized.

Throughput

| DEFINITIONS | |
|---|---|
| Tcw - | total control window time for each stream segment |
| Tdw - | data window time for each stream segment |
| Trs - | repeat sequence time within a data window |
| Tns - | next data set time within a data window |
| Tdw = | Trs + Tns |
| Tsg = | Tdw + Tcw, stream segment time |
| BS - | bytes per sample |

The Actual Channel Rate, ACR, is the average throughput of the wireless network card. For a 54 Mbps card, this is typically 66% of max rate or approx 3.6 MB/sec. For a 5.1- or 6 channel, 24 bit audio stream, BS=18 bytes per sample. So ACR is 3.6 MB/sec or 200 KSamples/sec.

SRATE_IN is the average stream rate. This is the number of samples N transferred per stream segment divided by the stream segment time Tsg.

SRATE_IN=N/Tsg=N/(Tcw+Trs+Tns)

N=ACR*Tns

SRATE_IN=ACR*Tns/(Tcw+Trs+Tns)

If Tcw=(% tcw)*Tns

And Trs=(% trs)*Tns

SRATE_IN=ACR*Tns/(% tcw+% trs+1)*Tns

SRATE_IN=ACR/(1+% tcw+% trs)

If % tcw=approx 5% and % trs=approx 5%

SRATE_IN=ACR/1.1

SRATE_IN=approx 200 K/1.1=182 K samples/Sec

SRATE_OUT is the rate at which data is output to the speaker during playback. For a 44.1 Khz output stream SRATE_OUT=44.1K samples/sec.

Samples Build Up Rate SBU_RATE is SRATE_IN−SRATE_OUT

SBU_RATE=approx 90K samples/sec

This means that for every sample out approximately three additional samples are accumulated. If Tdelay is the delay in mSeconds between receiving stream samples at the destination and starting stream output, and Tstream is the time since the start of streaming, and Tdrop is the maximum RF channel drop out the stream can accommodate. Then:

$$Tdrop=(Tdelay+Tstream)*3$$

After 10 msec, approx 30 msec of sample data has accumulated. If sample output to a destination device such as a speaker is delayed by 10 msecs, and allows the stream wireless Link channel to drop out for 30 msec, without data loss. After 50 msecs of streaming, the system can drop 150 msec of data without breaking the stream.

Each frame is estimated at about 400 usecs per frame. Therefore, in one aspect, the size of each frame needs to be approx 3.6*400=1440 bytes. If each sample is 18 bytes this represents approximately 80 samples per frame of uncompressed data.

Compression with a codec such as FLAC provides approx 50% compression. This means each frame carries 160 samples per second and the SBU_RATE would double from 90K samples/sec to 180K samples/sec or 6 times SRATE_OUT. Therefore, a 10 msec start delay can accommodate a 60 msec dropout.

Autoequalizing Speaker and Drive

Figure 5:
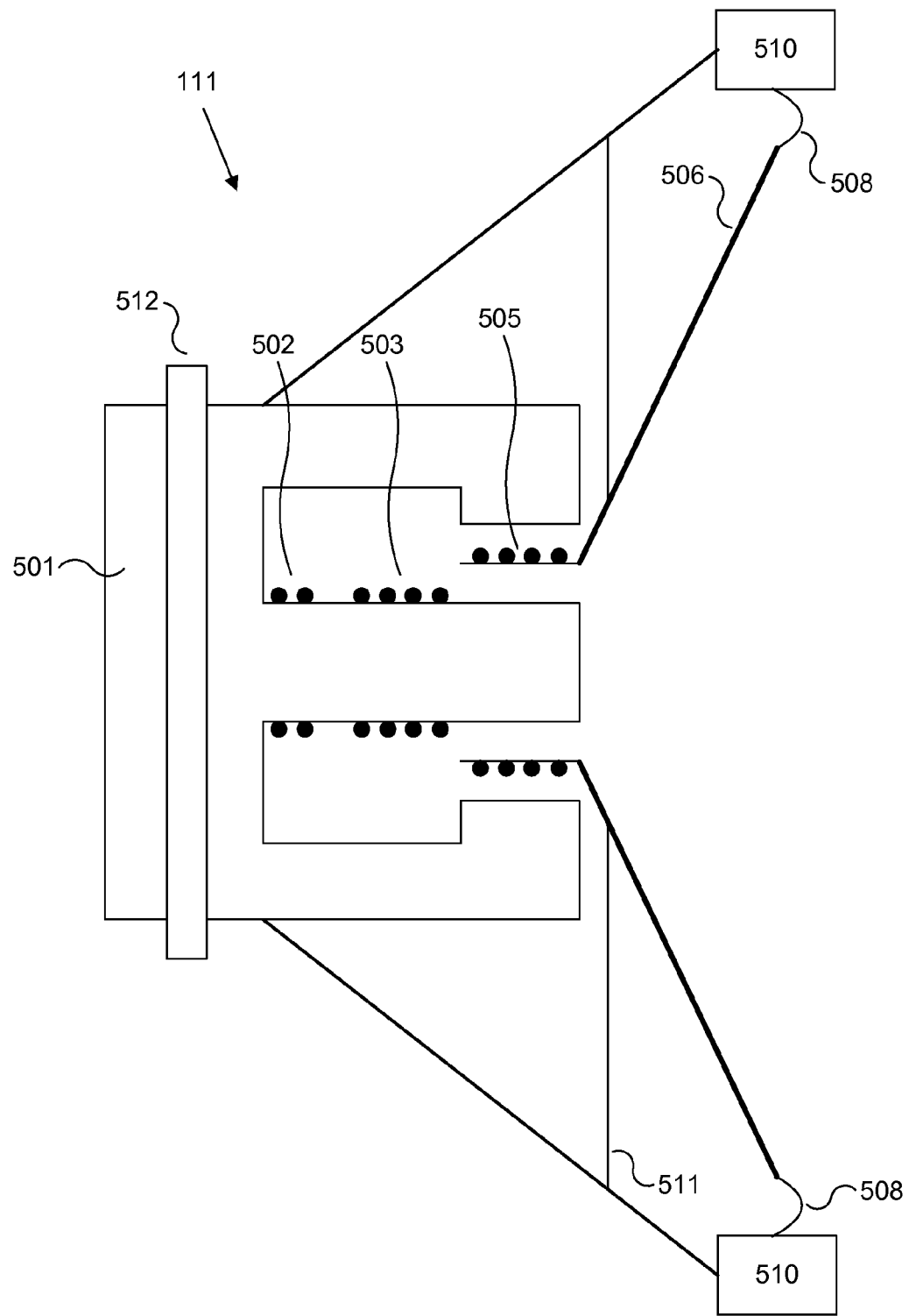
FIG. 5 is a functional block diagram of an autoequalizing speaker of the streaming media system shown in FIG. 1 in accordance with an embodiment of the present invention.

FIG. 5 is a view of autoequalizing speaker and drive system module 111 of streaming media system 102 shown in FIG. 1 in accordance with an embodiment of the present invention. In one aspect, autoequalizing speaker and drive system module 111 may be practical in combination with the ability to receive the streaming media. The processing and electronics capability necessary at the destination to receive streaming media also provides the processing power necessary for the detection of speaker non linearities via the sense coil and then the compensating for these non linearities via a combination of the voice coil and magnet coil signal, as further described.

In one aspect, autoequalizing speaker and drive system 111 is embodied as a speaker system that is an active device. Autoequalizing speaker and drive system 111, sometimes referred to as simply "speaker and drive system" includes a housing 501, a first coil, e.g., a voice coil 505 associated with the diaphragm 506, the diaphragm 506 associated with the surround 508 and a spider 511 that together holds diaphragm 506 in place and yet allows movement, e.g., horizontal movement. Both the spider 511 and surround 508 are connected to the frame 510. The frame 510 also holds the housing 501.

Speaker and drive system 111 further includes a second coil, e.g., an electro magnet coil 503. In various aspects, the electro magnet coil 503 may either replace or supplement a permanent magnet 512. Electro magnet coil 503 is driven with a current that can also be modulated by the electronics controlling this speaker, thus providing a modulated magnetic field for the voice coil 505. The location of the electromagnet coil 503 shown is one embodiment. It however can be located in a number of positions such that it provides a magnetic field of uniform field strength throughout the movement range of the voice coil 503.

The sensor coil 502 senses diaphragm movement by detecting changes in magnetic flux caused by the movement of the diaphragm 506 and voice coil 505. Sensor 502 includes various alternative embodiments, such as a magnetic flux sensor, an optical detector, and an infrared detector, that also provide a signal related to diaphragm movement. In an alternative embodiment, the sensor 502 may detect the acoustic waves created by the speaker, rather than the diaphragm movement.

Figure 6:
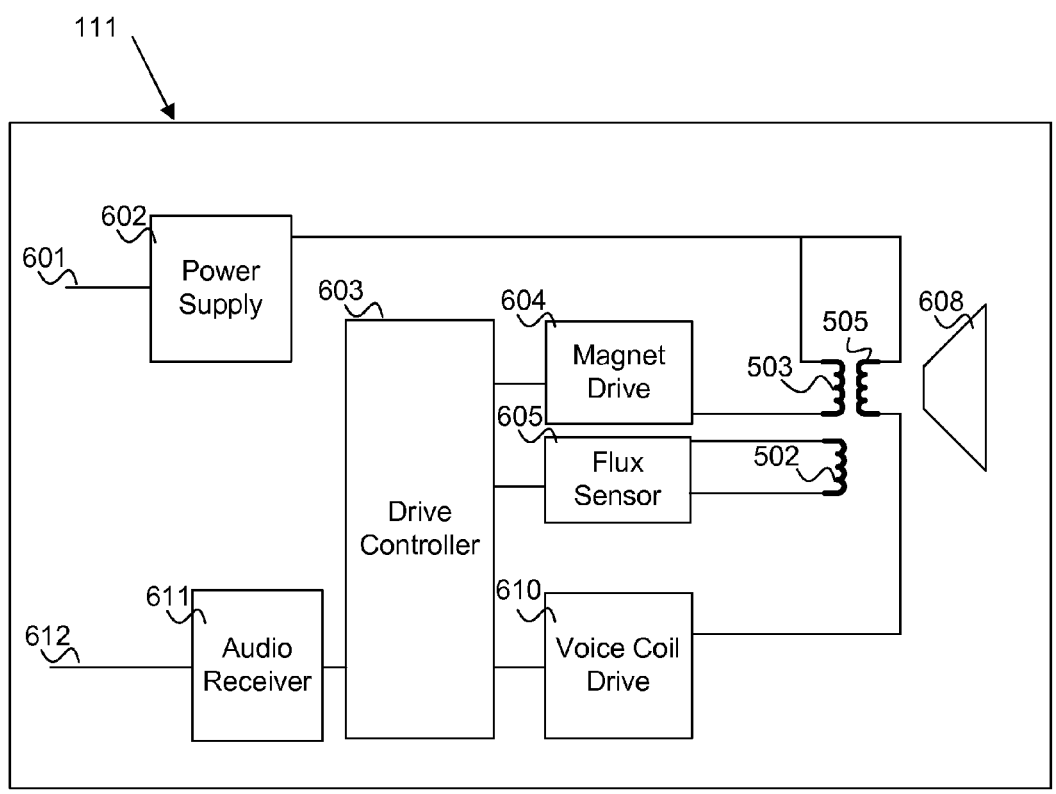
FIG. 6 is a block diagram of the autoequalizing speaker drive system module of the streaming media system shown in FIG. 1 in accordance with an embodiment of the present invention.

FIG. 6 is another view of autoequalizing speaker and drive system module 111 of streaming media system 102 shown in FIG. 1 in accordance with an embodiment of the present invention. Speaker and drive system 111 includes a power supply unit 602, which receives a power from an external source via line 601, a drive controller 603, a magnet drive 604, a flux sensor 605, a voice coil drive 610, and an audio receiver 611 for receiving an audio signal 612 from an audio source (not shown).

Also shown in FIG. 6 are the three coils in this speaker, voice coil 505, electro magnet coil 503, and sensor coil 502.

In one aspect, voice coil 505 is driven by a standard amplifier in the voice coil drive 610 based on the audio input from audio receiver 611. Magnet coil 503 is driven by magnet drive 604 that produces a DC current modulated by an AC current into the magnet coil 503. The DC current controls the speaker power level. The AC current is designed to compensate for the diaphragm movement non linearities detected via sense coil 502. The sensor 502 signal is processed by flux sensor 605, e.g., a flux sense circuit and provided to drive controller 603. Drive controller 603 takes the input audio signal 612 coming in via the audio receiver 611 together with the diaphragm movement feedback coming from the flux sensor 605 and uses these signals to produce a signal for the voice coil drive 610 and the magnet drive 604. Drive controller 603 uses the audio receiver 611 to produce the voice coil drive signal and uses the flux sense 605 signal to compensate for inaccuracies in the representation of the audio signal by adjusting the signal to the magnet drive 604. In an alternative embodiment, the compensation adjustment can take place on both the voice and magnet coil 503, 505.

In an alternative embodiment, the signals to the magnet coil 503 and voice coil 505 are each pulse trains with the degree of overlap between these pulse trains, determining the force with which the diaphragm 506 is moved. The direction of movement of the diaphragm 506 is determined by whether the pulses trains cause current flow in the same or opposite direction in each coil with respect to each other.

In an alternative embodiment, rather than the changing the relative overlap of the pulse trains, this relative overlap is kept constant, but the width of the voice coil pulse is varied to create a lesser or greater overlap with the magnet coil pulse train. Again the direction of current flow caused by the pulse train determines the direction the diaphragm 506 moves in.

In both the above embodiments, the frequency of the pulse train is high enough that the electrical and mechanical properties of the speaker system, filter out harmonics at the pulse train frequency and above, such that they are not audiable.

In another aspect, voice coil drive 610 is given a pulse width modulated waveform that is proportional to the audio signal and the voltage level coming out of power supply 602 at that moment. This is correlated with another pulse width modulated waveform driving electro magnet coil 503 that includes non linearity compensation computed from (flux) sensor 502. All of these waveforms are generated by a signal processor in the drive controller 603 in real time. Using relative pulse phase or pulse width modulation rather than amplitude modulation to drive the speaker improves efficiency by limiting the time the output stages of the amp are in the region between fully on and fully off. Such improvements with pulse width modification allow the power supply transformer to be reduced or eliminated and allows the AC to drive the speaker directly. One advantage in doing this is that the cost and weight of a transformer is directly proportional to the amount of dynamic current/power it can provide. When a bass drum is hit from silence, the transformer would need to go from 0 to many amps in milliseconds and this load may be sustained for longer than typical power supply capacitors can accommodate without droop. With this design, the AC mains would be able to dump current directly to the speaker, only limited by the modulation at the other end. One aspect also includes a safety mechanism (not shown) in power supply unit 602 for protection.

In another aspect of the system, the drive controller 603 may process and compensate the audio signal based on properties regarding the speaker subsystem that have been previously stored. These properties may have been obtained by locally analyzing the characteristics of the speaker subsystem or may have been provided by the source. Local analysis can be performed by driving the voice coil 505 with a known signal and detecting its effect with the sensor 502.

The present invention also eliminates the traditional low pass filter on class D digital amp, by allowing the low pass filtering to take place directly by the inductance and effective mechanical filter of the speaker.

Multimedia Subsystem with Remote Wireless Amps

Figure 7:
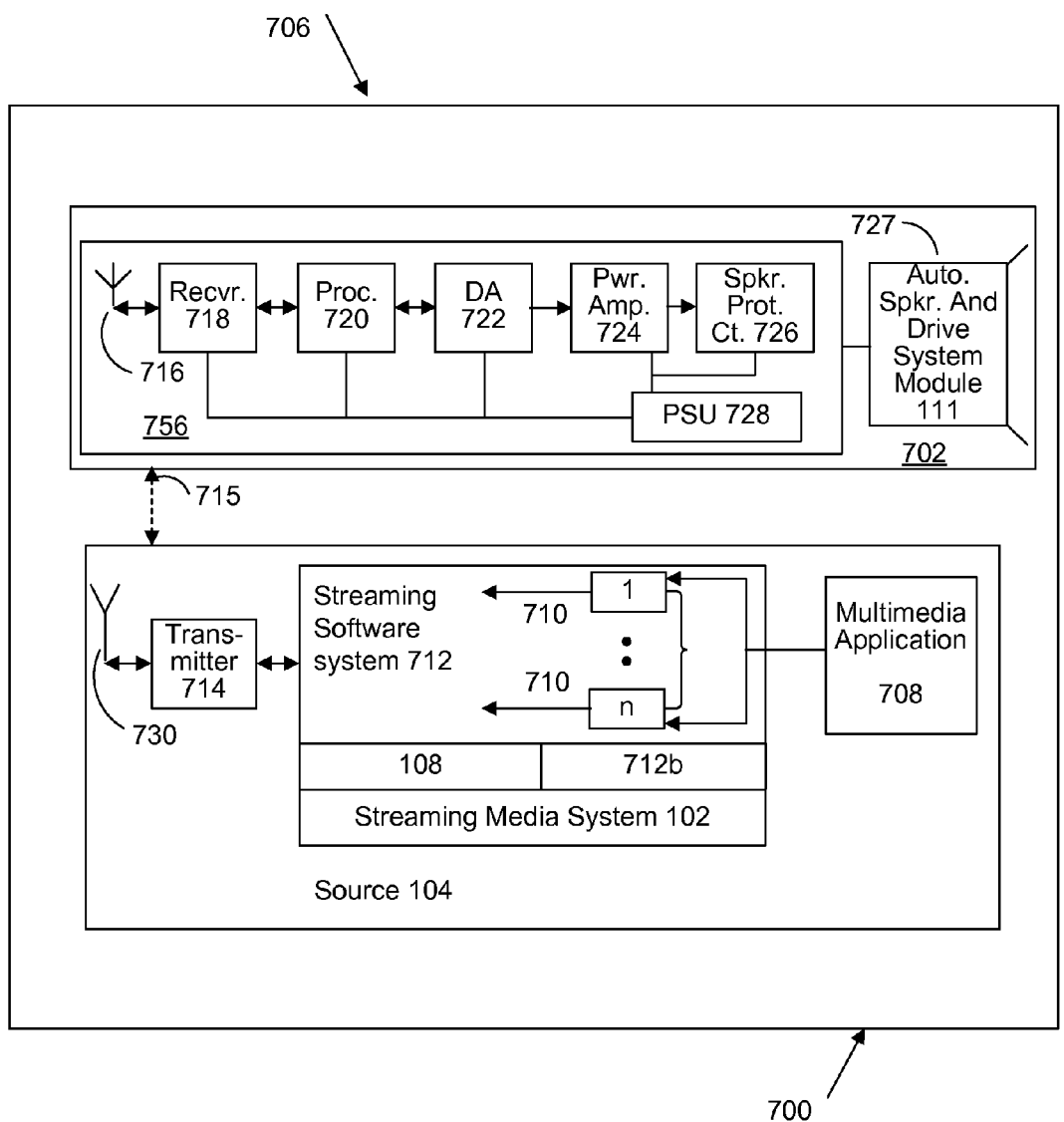
FIG. 7 is a block diagram of an exemplary speaker subsystem arrangement in accordance with an embodiment of the present invention.

FIG. 7 is an example speaker subsystem arrangement 700 in accordance with an embodiment of the present invention. Speaker subsystem arrangement 700, sometimes referred to simply as "arrangement", is typically used in multimedia applications with a surround sound speaker setup. Arrangement 700 includes or is associated with source 104 and one or more wireless speaker subsystems 702, each wireless speaker subsystem 702 including a wireless speaker adapter 756 and a speaker 727. The wireless speaker subsystem 702 is also referred to as a destination device 106 as shown in FIG. 1. In one example, for instance, there are eight wireless speaker subsystems 702 arranged around a listening area, with two in front, left and right, two in the back, left and right, two on the sides, left and right, a front center, and a subwoofer speaker. In various aspects, fewer or greater numbers of speaker subsystems 702 may be used.

In some embodiments, the speaker subsystem 702 may be distributed across various rooms in a home or commercial building such as a hotel or campus. Each subsystem may correspond to one channel and there may be many speaker subsystems associated with one channel.

The eight speaker subsystems 702 are addressed and communicate with one or more sources 104 which include modules of streaming media system 102 to facilitate media streaming. Source 104, typically runs a multimedia application 708, such as an audio player or video (Movie or TV) player that generates multi-channel surround sound audio. The source 104 contains a streaming software system 712 which implements some or all of the modules of streaming media system 102 and device driver 108 in FIG. 1. Each surround sound audio channel 710, sometimes referred to simply as "audio channel", produced by the media application 708 is intercepted by the device driver 108 part of the streaming software system 712. Streaming software system 712 streams each audio channel 710 to the relevant wireless speaker subsystem 702 by using a wireless transmitter 714 on source 104 or connected to source 104 via an IP network (e.g., the wireless transmitter 714 may be part of an 802.11 access point connected to the source via an IP network, and that source 104 uses to communicate with the destination devices).

In one aspect, wireless transmitter 714 is an 802.11 protocol wireless adapter and streaming software system 712 streams the audio using a UDP protocol. Each wireless speaker subsystem 702 is assigned a unique Internet Protocol (IP) address. Streaming software system 712 uses this unique IP address to address and stream the audio information. Streaming software system 712 also manages the configuration of each wireless speaker subsystem 702, such as enabling the IP address of the wireless speaker subsystem 702 to be changed. In addition streaming software system 712 performs a combination of audio processing functions on the audio stream, such as mixing channels, changing amplitude, and adding an echo by combining with a delayed version of the signal, etc. In addition, the streaming software system 712 implements the various modules of streaming media system 102 and device driver 108 to perform de channelization of the media into independent streams, blocking of the data and compression. Still further, streaming software program 712 may perform precompensation activities. Pre compensation includes compensating for deficiencies in the media or the devices that render the media into audio or video. In addition pre compensation can be used to enhance an aspect of the media.

In an alternative aspect, some of this processing can be done at wireless speaker subsystem 702, based on information sent from streaming software system 712.

In yet another aspect, some or all of the precompensation activities can be performed by streaming device driver 108.

In one aspect, streaming software system 712 comprises of an audio device driver 108 and a service and control application 712b. Audio device driver 108 represents the system including streaming software system 712 and the many wireless speaker subsystems 702, to the multi media application 708, as a standard multi media device. Audio device driver 108 does this by creating a virtual multi media device on the source system 104. The audio device driver 108 is also responsible for performing the streaming to the wireless speaker subsystem 702. The service provides control and monitory services to the system 700. For example, it may collect diagnostic information from the destinations. The control application 712b allows the user to configure and control the system 700. One example is to allow the user to define which speaker is front left, which is front right, etc.

Wireless speaker subsystem 702 comprises an antenna 716, which receives the wireless transmissions 715 from source 104 via an 802.11 receiver 718; a processor subsystem 720 that includes a CPU, memory that contains data and programs, and a variety of peripherals such as timers; a Digital-to-Analog converter (D/A) 722; a power amplifier 724; and a speaker protection circuit 726. D/A 722 may be implemented, for example, as a 24 Bit serial, low noise device. Power amplifier 724 may be implemented, for example, as a 100 Watt amplifier. Power amplifier 724 may include, for example, short circuit and over voltage protection. Speaker protection circuit 726 may include, for example, additional protections, such as cutting out the output signal if any DC current going to the speakers is detected.

Wireless speaker subsystem 702, also referred to as the speaker adapter, includes a power supply unit (PSU) 728. PSU 728, for example, is a linear power supply that is adequate supply power to amplifier 724. In this case, PSU 728 can provide 200 Watt on a +40V, −40V supply to the amplifier 724. PSU 728 also provides a lower power, +12V, +5V, to the rest of the system, including receiver 718, processor subsystem 720, and DA 722.

The effect of speaker subsystem arrangement 700 is to allow the cluster to stream surround sound to a set of surround sound speakers, without the need for speaker wires to go from the cluster to the speakers.

Figure 8:
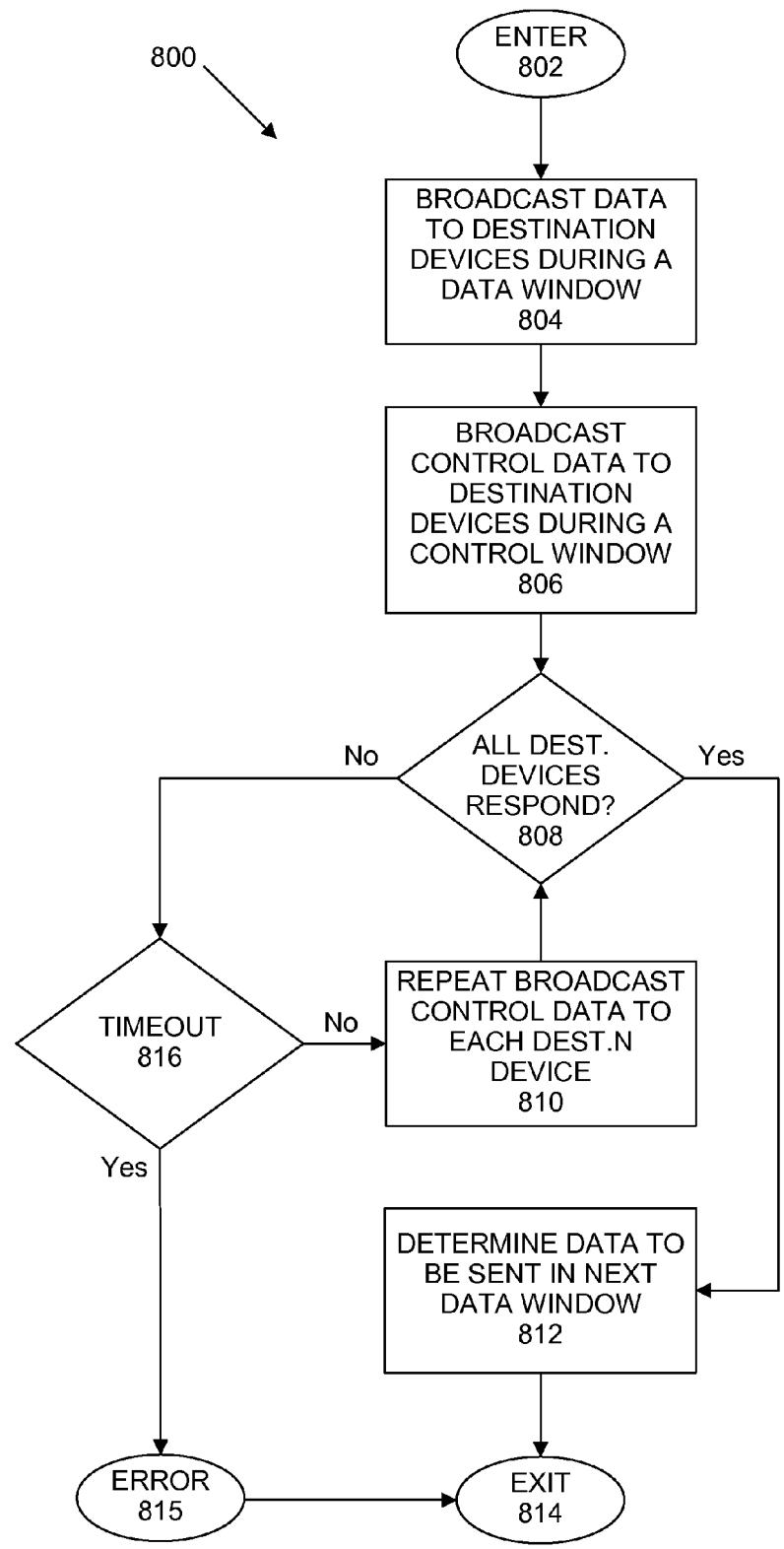
FIG. 8 shows a flowchart of a contention management method in accordance with an embodiment of the present invention.

FIG. 8 shows a flowchart of a contention management method 800 in accordance with an embodiment of the present invention. From an ENTER OPERATION 802, flow control moves to a BROADCAST DATA TO DESTINATION DEVICES DURING A DATA WINDOW OPERATION 804. In BROADCAST DATA TO DESTINATION DEVICES DURING A DATA WINDOW OPERATION 804, a source broadcasts data to a predetermined set of destination devices during a data window.

From BROADCAST DATA TO DESTINATION DEVICES DURING A DATA WINDOW OPERATION 804, flow control moves to a BROADCAST CONTROL DATA TO DESTINATION DEVICES DURING A CONTROL WINDOW OPERATION 806. In BROADCAST CONTROL DATA TO DESTINATION DEVICES DURING A CONTROL WINDOW OPERATION 806, a message (control data) is broadcast to the predetermined set of destination devices during a control window. The message requests that all destination devices in the set of destination devices report the data received.

From BROADCAST CONTROL DATA TO DESTINATION DEVICES DURING A CONTROL WINDOW OPERATION 806, flow control moves to an ALL DESTINATION DEVICES RESPOND CHECK OPERATION 808. In ALL DESTINATION DEVICES RESPOND CHECK OPERATION 808, a determination is made whether a response to the request sent in BROADCAST CONTROL DATA TO DESTINATION DEVICES DURING A CONTROL WINDOW OPERATION 806 has been received within a predetermined timeout period from all destination devices in the predetermined set of destination devices.

If it is determined that one or more responses have not been received from the destination devices in the predetermined set of destination devices within the timeout period, flow control moves from ALL DESTINATION DEVICES RESPOND CHECK OPERATION 808 to a TIMEOUT CHECK OPERATION 816. In TIMEOUT CHECK OPERATION 816, a check is made to determine whether the number of times REPEAT BROADCAST 810 was performed exceeds a timeout period. If TIMEOUT OPERATION 816 has not expired, flow moves to REPEAT BROADCAST CONTROL DATA TO EACH DESTINATION DEVICE OPERATION 810. In REPEAT BROADCAST CONTROL DATA TO EACH DESTINATION DEVICE OPERATION 810, a source repeats the control data individually or as a broadcast to each destination device in the predetermined set of destination devices.

From REPEAT BROADCAST CONTROL DATA TO EACH DESTINATION DEVICE OPERATION 810, flow returns to ALL DESTINATION DEVICES RESPOND CHECK OPERATION 808.

If it is determined that a response has been received from each destination device in the predetermined set of destination devices, the flow moves from ALL DESTINATION DEVICES RESPOND CHECK OPERATION 808 to DETERMINE DATA TO BE SENT IN NEXT DATA WINDOW OPERATION 812.

In DETERMINE DATA TO BE SENT IN NEXT DATA WINDOW OPERATION 812, the source uses response information to determine which data are to be sent in the next data window. In one aspect, the response information identifies data received and identifies missing data. From DETERMINE DATA TO BE SENT IN NEXT DATA WINDOW OPERATION 812, flow control exits in an EXIT OPERATION 814.

If TIMEOUT CHECK 816 expires after several repeat operations, then flow moves to an ERROR OPERATION 815 which provides an error function, e.g., causes the streaming process to stop. From ERROR OPERATION 815, flow control exits in an EXIT operation 814.

Figure 9:
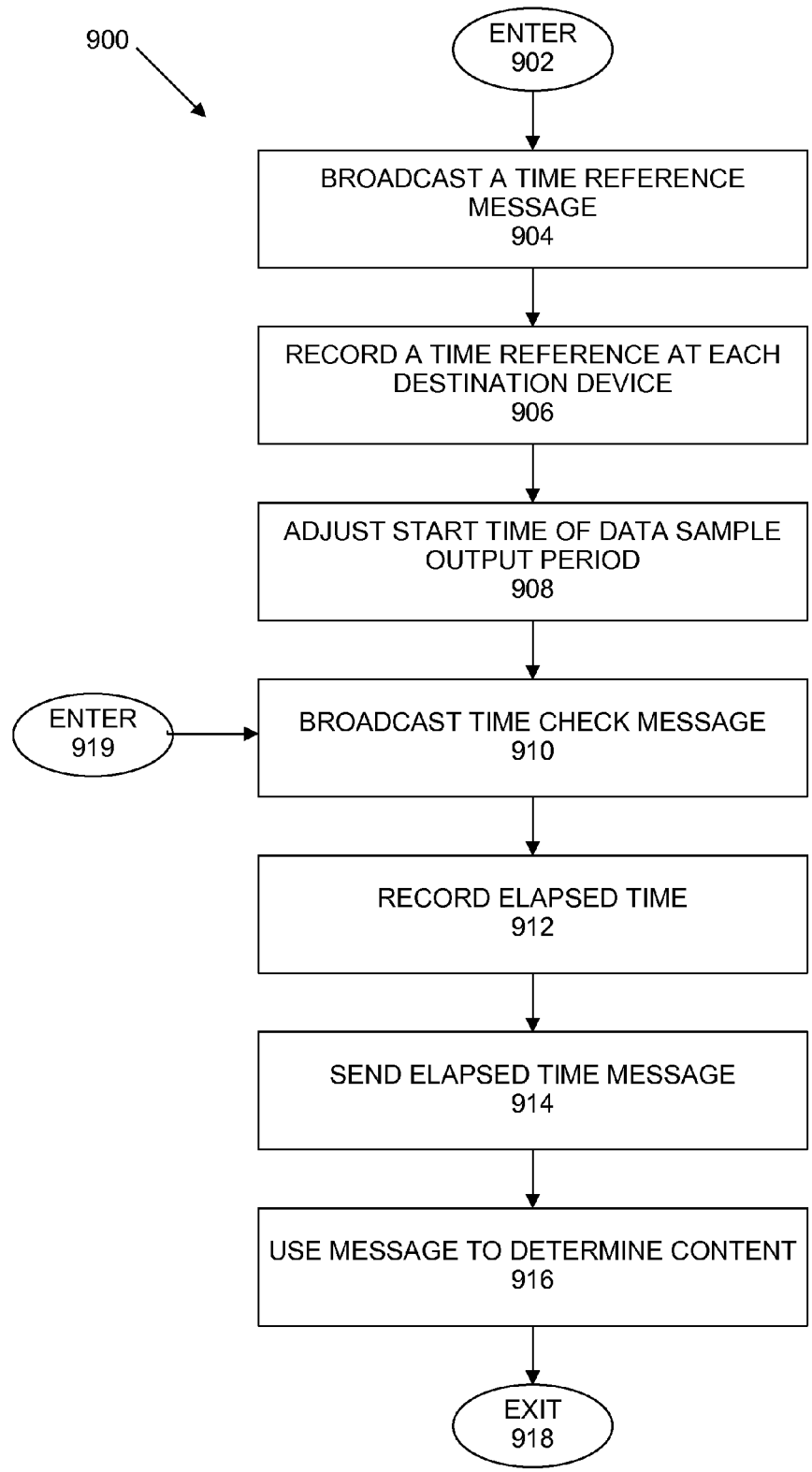
FIG. 9 shows a flowchart for a method for synchronizing the time output of data samples at multiple destination devices receiving the same packet data stream in accordance with one embodiment of the invention.

FIG. 9 shows a flowchart for a method 900 for synchronizing the time output of data samples at multiple destination devices receiving the same packet data stream in accordance with one embodiment of the invention. At the start of streaming, flow starts at ENTER OPERATION 902, and flow control moves to a BROADCAST A TIME REFERENCE MESSAGE OPERATION 904. In BROADCAST A TIME REFERENCE MESSAGE OPERATION 904, a source broadcasts a time reference message to a predetermined set of destination devices.

From BROADCASTING A TIME REFERENCE MESSAGE OPERATION 904, flow control moves to a RECORD A TIME REFERENCE AT EACH DESTINATION DEVICE OPERATION 906. In RECORD A TIME REFERENCE AT EACH DESTINATION DEVICE OPERATION 906, upon receipt of the broadcasted time reference message, each destination device in the predetermined set of destination devices records a time reference.

From RECORD A TIME REFERENCE AT EACH DESTINATION DEVICE OPERATION 906, flow control moves to an ADJUST START TIME OF DATA SAMPLE OUTPUT PERIOD OPERATION 908. In ADJUST START TIME OF DATA SAMPLE OUTPUT PERIOD OPERATION 908, each destination device in the predetermined set of destination devices adjusts a start time of a data sample output period to a fixed time offset from the recorded time reference.

From ADJUST START TIME OF DATA SAMPLE OUTPUT PERIOD OPERATION 908, flow control moves to a BROADCAST TIME CHECK MESSAGE OPERATION 910. In BROADCAST TIME CHECK MESSAGE OPERATION 910, the source broadcasts a time check message to the predetermined set of destination devices.

From BROADCAST TIME CHECK MESSAGE OPERATION 910, flow control moves to a RECORD ELAPSED TIME OPERATION 912. In RECORD ELAPSED TIME OPERATION 912, upon receipt of the broadcasted time check message, each destination device in the predetermined set of destination devices records a time elapsed between receipt of the broadcasted time check message and a most recent time that a data sample was output.

From RECORD ELAPSED TIME OPERATION 912, flow control moves to a SEND ELAPSED TIME MESSAGE OPERATION 914. In SEND ELAPSED TIME MESSAGE OPERATION 914, each destination device in the predetermined set of destination devices sends a message indicating the recorded elapsed time.

From SEND ELAPSED TIME MESSAGE OPERATION 914, flow control moves to a USE MESSAGE TO DETERMINE CONTENT OPERATION 916. In USE MESSAGE TO DETERMINE CONTENT OPERATION 916, the source uses the elapsed time message to determine content of a message to the predetermined set of destination device to advance a start time of the data sample output period or to send another message to the predetermined set of destination devices to retard the start time of the data sample output period.

From USE MESSAGE TO DETERMINE CONTENT OPERATION 916, flow exits in an EXIT OPERATION 918.

After the first Entry through ENTER 902, at subsequent periodic intervals, flow will enter at ENTER 919 and then continue flow as described above. For example, after the start of streaming and the first time reference message, subsequently the process only starts at the time check message.

The present invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be, but is not limited to, an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and WiFi and Ethernet cards are just a few of the currently available types of network adapters.

It should be understood, of course, that the foregoing relates to exemplary embodiments of the invention and that modifications may be made without departing from the spirit and scope of the invention as set forth in the following claims.

What is claimed is:

1. An audio system for streaming using a network, comprising:
   a streaming media system transmitting an audio stream including at least a first media channel and a second media channel;
   a first audio producing device communicating with the streaming media system, the first audio producing device configured to produce a first output of sounds corresponding to the first media channel; and
   a second audio producing device communicating with the streaming media system, the second audio producing device configured to produce a second output of sounds corresponding to the second media channel, the second output synchronized with the first output by delaying or advancing producing of the second output based on a timing value received at the second audio producing device;
   wherein the streaming media system further comprises a wireless streaming protocol module: disallows the first and second audio producing devices from sending data to the streaming media system during a first window of time; and
   disallows the streaming media system from sending data of the first and second media channels to the first and second audio producing devices during a second window of time.

2. The audio system of claim 1, wherein the streaming media system is configured to communicate with a handheld portable computing device to receive media that is converted to the audio stream for transmission to the first and second audio producing devices.

3. The audio system of claim 1, wherein the first and second audio producing devices are located remotely from each other and networked by wireless or wired IP networks.

4. The audio system of claim 1, wherein the streaming media system further comprises a streaming device driver that represents the streaming media system as a standard audio device to a software application.

5. The audio system of claim 1, wherein the streaming media system further comprises a synchronization mechanism module for determining the timing value.

6. The audio system of claim 5, wherein the streaming media system is configured to:
   send a plurality of frame data packets to the first and second audio producing devices; and
   send a plurality of time check packets to the first and second audio producing devices; and
   wherein the first or the second audio producing devices sends a time check acknowledgment packet to the synchronization mechanism module, the time check acknowledgment packet having: a clock stamp, and an elapsed clock count;
   wherein the synchronization mechanism module further computes timing values for each of the first and second audio producing devices based on the time check acknowledgement packet received from the first and second audio producing devices and sends the computed timing values to each of the first and second audio producing devices.

7. The audio system of claim 1, wherein the streaming media system further comprises an autoequalizing speaker and drive system module associated with the first and second audio producing devices.

8. The audio system of claim 7, wherein the autoequalizing speaker and drive system module comprises:
   a diaphragm;
   a voice coil associated with the diaphragm;
   a sensor associated with the voice coil, the sensor for sensing a signal related to the movement of the diaphragm and the voice coil; and
   an electro magnet coil associated with the sensor, the electro magnet coil for providing a modulated magnetic field for the voice coil.

9. A method for synchronizing outputs at a plurality of audio producing devices, the method comprising:
   receiving an audio stream from a streaming media system the audio stream including at least a first media channel and a second media channel;
   producing a first output of sounds corresponding to the first media channel at a first audio producing device;
   generating a timing value for synchronizing a second output of a second audio producing device with the first output; and
   synchronizing, at the second audio producing device, producing of the second output of sounds corresponding to the second media channel with the first output by advancing or delaying producing of the second output based on the timing value
   disallowing the first and second audio producing devices from sending data to the streaming media system during a first window of time; and
   disallowing the streaming media system from sending data of the first and second media channels to the first and second audio producing devices during a second window of time.

10. The method of claim 9, wherein the streaming media system receives media converted to the audio stream from a handheld portable computing device.

11. The method of claim 9, wherein the first and second audio producing devices are located remotely from each other and networked by wireless or wired IP networks.

12. The method of claim 9, wherein the streaming media system comprises a streaming device driver that represents the streaming media system as a standard audio device to a software application.

13. The method of claim 9, further comprising managing streaming contention at the streaming media system.

14. The method of claim 9, further comprising
   receiving a plurality of frame data packets from the streaming media system to the first and second audio producing devices; and
   receiving a plurality of time check packets from the streaming media system to the first and second audio producing devices; and
   sending a time check acknowledgment packet to the streaming media system.

15. The method of claim 14, wherein the time check acknowledgment packet comprises: a clock stamp, a frame number of a last frame sent to the source, and an elapsed clock count.

16. The method of claim 15, further comprising:
   computing, at the stream media system, global times at which a same frame was output at each of the first and second audio producing devices based on the time check acknowledgement packet.

17. The method of claim 9, further comprising:
   the streaming media system requesting and gaining access to a communication channel for transmitting data to the first and second audio producing devices during a data window time period; and each of the audio producing devices gaining access to the communication channel for transmitting information to the source during a control window time period.

18. The streaming audio system of claim 9, wherein the audio stream received from the streaming audio system is buffered at each audio producing device prior to producing output of the media at each audio producing device.

19. A streaming audio system for reproducing media audio producing devices, the media system comprising a processor and memory, the streaming processor comprising:

a streaming device driver for interfacing with a source for receiving media comprising a plurality of channels;

a multidestination streaming protocol module for sending each of the plurality of media channels to one or more audio producing devices for producing outputs of sounds;

a synchronization mechanism module for synchronizing the outputs of the sounds at the one or more audio producing devices by sending a timing value to at least one of the audio producing devices, the at least one audio producing device receiving the timing value delaying or advancing producing of output based on the timing value;

wherein the one or more audio producing devices are disallowed from sending data to the streaming media system during a first window of time; and wherein the streaming device driver is disallowed from sending data of the first and second media channels to the first and second audio producing devices during a second window of time.

20. The streaming audio system of claim 19, wherein the multidestination streaming protocol module manages streaming contention.

21. The streaming audio system of claim 19, wherein the streaming media system further sends a plurality of frame data packets to the plurality of audio producing devices during a data window; and the synchronization mechanism module further:

sends a plurality of time check packets to the plurality of audio producing devices; and receives time check acknowledgment packets from the one or more audio producing devices.

22. The streaming a audio system of claim 21, wherein the time check acknowledgment packet comprises: a clock stamp, a frame number of a last frame sent to the source, and an elapsed clock count.

23. The streaming audio system of claim 22, wherein the source computes global times at which a same frame is to be output at each of the plurality of audio producing devices based on the time check acknowledgement packet.

24. The streaming audio system of claim 22, wherein the multidestination steaming protocol module and the synchronization mechanism module are located remotely from each other and networked by a wireless or wired IP networks.

* * * * *